US 6,680,269 B2

(12) United States Patent
Sogabe et al.

(10) Patent No.: US 6,680,269 B2
(45) Date of Patent: Jan. 20, 2004

(54) BISMUTH PYROCHLORE MICROWAVE DIELECTRIC MATERIALS

(75) Inventors: Tomohiro Sogabe, Chiba (JP); Thomas R. Shrout, Port Matilda, PA (US); Michael T. Lanagan, State College, PA (US); Clive A. Randall, State College, PA (US); Hyuk-Joon Youn, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 215 days.

(21) Appl. No.: 09/892,364

(22) Filed: Jun. 27, 2001

(65) Prior Publication Data
US 2002/0033477 A1 Mar. 21, 2002

Related U.S. Application Data
(60) Provisional application No. 60/214,938, filed on Jun. 29, 2000.

(51) Int. Cl.$^7$ .............................................. C04B 35/495
(52) U.S. Cl. ...................................................... 501/134
(58) Field of Search ........................................ 501/134

(56) References Cited

U.S. PATENT DOCUMENTS

| 4,203,871 | A |   | 5/1980 | Horowitz et al. |         |
|-----------|---|---|--------|-----------------|---------|
| 4,377,840 | A |   | 3/1983 | Nair            |         |
| 5,449,652 | A | * | 9/1995 | Swartz et al.   | 501/134 |
| 5,499,207 | A |   | 3/1996 | Miki et al.     |         |
| 5,736,449 | A |   | 4/1998 | Miki et al.     |         |
| 5,766,336 | A |   | 6/1998 | Jansen et al.   |         |
| 5,976,624 | A |   | 11/1999| Ami et al.      |         |

FOREIGN PATENT DOCUMENTS

JP 6 208804 7/1994

OTHER PUBLICATIONS

D. P. Cann et al., "Investigation Of The Dielectric Properties of Bismuth Pyrochlores", *Solid State Commun.*, 100 (7) 529–34 (1996). No month provided.

M. Valant et al., "Crystal Chemistry and Dielectric Properties Of Chemically Substituted $(Bi_{1.5}Zn_{1.0}Nb_{1.5})O_7$ and $Bi_2(Zn_{2/3}Nb_{4/3})O_7$ Pyrochlores" *J. Am. Ceram. Soc.*, 83 (1), 147–53 (2000). No month provided.

D. Liu et al., "Phase Structure and Dielectric Properties of $Bi_2O_3$–ZnO–$Nb_2O_5$–Based Dielectric Ceramics", *J. Am. Ceram. Soc.*, 76 (8), 2129–32 (1993). No month provided.

H. C. Ling et al., "High Dielectric Constant and Small Temperature Coefficient Bismuth–based Dielectric Compositions", *J. Mater. Res.*, 5(8), 1752–62 (1990). No month provided.

(List continued on next page.)

*Primary Examiner*—David Brunsman
(74) *Attorney, Agent, or Firm*—Law Offices of John A. Parrish

(57) ABSTRACT

The disclosed invention relates to $Bi_2O_3$—ZnO—$Ta_2O_5$ dielectric compounds and compositions, and to their manufacture. The compounds of the invention have outstanding K, Q, TCF, and TCC. Examples of these properties include a K of between 58 and 80, a low dielectric loss (tan δ<0.003), and a TCC<30 ppm/° C. Ceramic compositions produced include those represented by $Bi_2(ZnTa_2)_xO_{6x+3}$ where $0.57 \leq x \leq 1.0$, $Bi_2(ZnTa_y)_{2/3}O_{((5y+11)/3)}$ where $1.0 \leq y \leq 3.0$, as well as by $Bi_2(ZnTa_y)_{2/3}O_{((5y+11)/3)}$ where $1.0 \leq y \leq 3.0$ with the proviso that y is not=2.0. Solid solutions of compounds defined by the formula $r(Bi_2(Zn_{1/3}Ta_{2/3})_2O_7)-(1-r)(Bi_{3/2}Zn_{2/3})(Zn_{1/2}Ta_{3/2})O_7))$ where $0<r<1$ also are produced.

21 Claims, 1 Drawing Sheet

OTHER PUBLICATIONS

G. I. Golovshchikova et al., "Relaxational Character of the Dielectric Polarization In The Region of The Phase Change of New Compounds Of the Pyrochlore Type", *Sov. Phys.–Solid State (Engl. Transl.)*, 14, 2539–42 (1973). No month provided.

X. Wang et al., "Structure, Phase Transformation, And Dielectric Properties Of Pyrochlores Containing Bismuth", *J. Am. Ceram. Soc.*, 80 (10), 2745–48 (1997). No month provided.

M. Valant et al., "Chemical Compatibility Between Silver Electrodes and Low–firing Binary–oxide Compounds: Conceptual Study", *J. Am. Ceram. Soc.*, 83 (11), 2721–29 (2000). No month provided.

R. S. Roth, "Phase Equilibrium Relations In The Binary System Lead Oxide–niobium Pentoxide," *J. Res. Nat. Bur. Stand.*, 62 (1) 27–38 (1959). No month provided.

M. A. Subramanian et al., "Oxide pyrochlores–A review", *Prog. Solid. State. Chem.*, 15, 55–143 (1983). No month provided.

A. Mergen et al., "Crystal Chemistry, Thermal Expansion and Dielectric Properties of $(Bi_{1.5}Zn_{0.5})(Zn_{0.5}Sb_{1.5})O_7$ Pyrochlore", *Mater. Res. Bull.*, 32, 175–89 (1997). No month provided.

G. Jeanne et al., "Synthase et Evolution De Nouveaux Pyrochlores Au Bismuth (Synthesis and Evolution Of The New Bismuth Pyrochlores)", *Mat. Res. Bull.*, 9, 1321–32 (1974). No month provided.

J. Nino et al., "Dielectric Relaxation in $Bi_2O_3$–ZnO–$Nb_2O_5$ cubic pyrochlore," *J. Appl. Phys.*, 89 (9), 1–5 (2001). No month provided.

G. A. Smolenskii et al., "New Compounds With The Pyrochlore Structure and Their Dielectric Properties", *Izv. Akad. Nauk SSSR. Neorg. Mat.*, (*Engl. Transl.*), 12, 255–58 (1974). No month provided.

W. D. Kingery et al., *Introduction to Ceramics*, 2nd ed., Ch. 18. Wiley, New York, pp. 913, 972 (1991). No month provided.

E. L. Colla et al., "Effect Of Structural Changes In Complex Perovskites On The Temperature Coefficient Of Relative Permittivity", *J. Appl. Phys.*, 74, 3414–25 (1993). No month provided.

R. D. Shannon, "Revised Effective Ionic Radii And Systematic Studies Of Interatomic Distances In Halides And Chalcogenides", *Acta. Crystallogr. Sect. A : Found. Crystallogr.*, A32, 751–67 (1976). No month provided.

Cho et al, Interaction of $BnbO_4$–Based Low Firing Ceramics with Silver Electrodes, J. Am. Ceram. Soc., 81[11]pp. 3038–3040 (1998). No month provided.

* cited by examiner

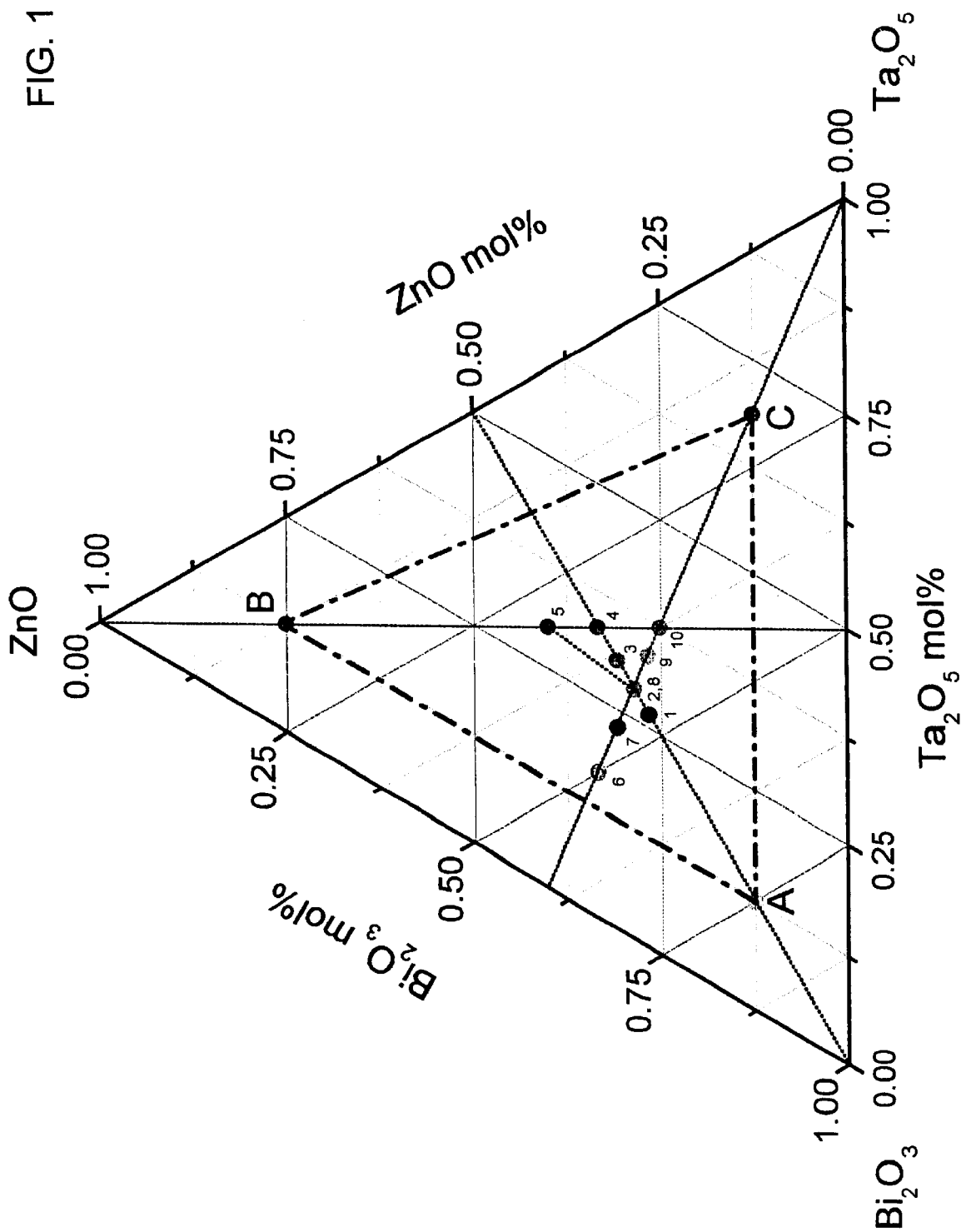

BISMUTH PYROCHLORE MICROWAVE DIELECTRIC MATERIALS

This application claims priority to U.S. Provisional Application No. 60/214,938 filed Jun. 29, 2000.

FIELD OF THE INVENTION

The present invention relates to dielectric ceramic compositions for microwave applications and, more particularly, to $Bi_2O_3$—$ZnO$—$Ta_2O_5$ dielectric ceramic compositions for microwave devices.

BACKGROUND OF THE INVENTION

In recent years, communication systems have developed which use microwaves (frequency band ranging from 300 MHz to 300 GHz). These systems include wireless telephones, car phones, cellular phones, satellite broadcasting systems, and the like. As a result, there is an increasing demand for dielectric ceramics with better electrical properties for use components such as resonator devices, band pass filters, and microwave integrated circuits.

Bismuth based pyrochlores have recently become of interest for use as high frequency dielectric materials. One of the bases for this interest is that: they can be fired at low temperatures. In contrast to conventional microwave dielectric materials which require sintering temperatures of more than 1600° K, Bismuth pyrochlores can be sintered at less than about 1400° K. In addition, their dielectric properties such as a low loss of tan $\delta$ of $10^{-4}$ and a K of up to about 150 make Bismuth pyrochlores promising dielectric material candidates.

For use in microwave communications systems which operate at high frequencies, dielectric materials should have properties such as high dielectric constant ("K"); high quality factor ("Q"); and stable temperature coefficient of capacitance ("TCC"). However, it is very difficult to develop dielectric materials which have a stable TCC as well as high K and high Q. A need therefore continues to exist for a dielectric material which has a high K, a high Q value and a stable TCC.

BRIEF DESCRIPTION OF THE DRAWINGS

FIG. 1 shows a ternary phase diagram of $Bi_2O_3$—$ZnO$—$Ta_2O_5$ and a compositional space defined by vertices A, B and C.

SUMMARY OF THE INVENTION

The present invention provides $Bi_2O_3$—$ZnO$—$Ta_2O_5$ dielectric materials which have both high K and high Q, and which can be fired at low temperatures such as less than about 1000° C.

Compounds within the compositional space defined by vertices A, B and C of the $Bi_2O_3$—$ZnO$—$Ta_2O_5$ system shown in FIG. 1 are produced. These compounds are illustrated by $Bi_2(ZnTa_2)_xO_{6x+3}$ where $0.57 \leq x \leq 1.0$, by $Bi_2(ZnTa_y)_{2/3}O_{((5y+11)/3)}$ where $1.0 \leq y \leq 3.0$, as well as by $Bi_2(ZnTa_y)_{2/3}O_{((5y+11)/3)}$ where $1.0 \leq y \leq 3.0$ with the proviso that y is not=2.0. In FIG. 1, vertex A is defined by 0.125 mol % $Ta_2O_5$, 0.125 mol % ZnO, 0.75 mol % $Bi_2O_3$; vertex B is defined by 0.125 mol % $Ta_2O_5$, 0.75 mol % ZnO, 0.125 mol % $Bi_2O_3$; and vertex C is defined by 0.6875 mol % $Ta_2O_5$, 0.125 mol % ZnO, 0.1875 mol % $Bi_2O_3$.

Mixed phases and solid solutions on the tie line between the compounds of examples 5 and 8 within the compositional space A-B-C of FIG. 1, as defined by the formula $r(Bi_2(Zn_{1/3}Ta_{2/3})_2O_7)$-$((1-r)(Bi_{3/2}Zn_{1/2})(Zn_{1/2}Ta_{3/2})O_7))$ where $0<r<1$, also are produced.

These compounds typically have a high K, high Q, a low TCC, and low TCF over the frequency range of 1 MHz–28 GHZ, and can be sintered between about 850° C. to about 1000° C., preferably between about 850° C. to about 950° C. Borosilicate glass in an amount of up to about 5 wt. % based on the weight of compound, preferably $Bi_2(ZnTa_2)_{2/3}O_7$, may be added to the compound.

The $Bi_2O_3$—$ZnO$—$Ta_2O_5$ dielectric compounds of the invention have outstanding K, Q, TCC and temperature coefficient of resonant frequency ("TCF"). Typical properties include a K of 50–80, such as K>60 at 5 GHz, low dielectric loss (tan $\delta<0.003$) such as a tan $\delta<0.001$ at 5 GHz, a Q>300 at 5 GHz, a $Q_f>2000$ at 5 GHZ, a TCF<40 ppm/°C. over the temperature range of $-50°$ C. to $+125°$ C., a TCC<50 ppm/°C. such as a TCC of <30 ppm/°C. over the temperature range of $-50°$ C. to $+125°$ C.

DETAILED DESCRIPTION OF THE INVENTION

In a first embodiment, compounds of $Bi_2(ZnTa_2)_xO_{6x+3}$ where $0.57 \leq x \leq 1.0$, of $Bi_2(ZnTa_y)_{2/3}O_{((5y+11)/3)}$ where $1.0 \leq y \leq 3.0$ and of $Bi_2(ZnTa_y)_{2/3}O_{((5y+11)/3)}$ where $1.0 \leq y \leq 3.0$ with the proviso that y is not=2.0 are produced. Manufacture of these compounds is illustrated in examples 1–14.

EXAMPLES 1–14

In manufacture of compounds of the formula $Bi_2(ZnTa_2)_xO_{6x+3}$, ZnO and $Ta_2O_5$ are reacted at 1000° C. to produce $(ZnTa_2)_xO_{6x}$ according to equation (1):

$$x(ZnO) + x(Ta_2O_5) \rightarrow (ZnTa_2)_xO_{6x} \qquad (1)$$

The $(ZnTa_2)_xO_{6x}$ then is reacted at 1000° C. with $Bi_2O_3$ according to equation (1A) to produce a compound corresponding to $Bi_2(ZnTa_2)_xO_{6x+3}$:

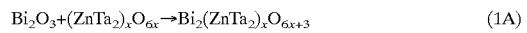

$$Bi_2O_3 + (ZnTa_2)_xO_{6x} \rightarrow Bi_2(ZnTa_2)_xO_{6x+3} \qquad (1A)$$

In manufacture of $(ZnTa_2)_xO_{6x}$, reagent grade ZnO of 99.9% purity from Aldrich Chemical Co. and reagent grade $Ta_2O_5$ of 99.9% purity from Aldrich Chemical Co. are milled in deionized water in a ball mill. Milling is performed for 24 hours using yttrium-stabilized zirconia balls to produce a blend that has a particle size range of 0.3 to 1.5 microns, and an average particle size of 1.0 micron. The resulting milled particle blend is dried in air at 120° C. for 16 hours. The resulting dried particles are calcined at 1000° C. in an open alumina crucible for 4 hours to produce $(ZnTa_2O_6)_x$.

$Bi_2O_3$ is mixed with the $(ZnTa_2O_6)_x$ powder. The resulting mixture is ball milled for 24 hours using yttrium-stabilized zirconia balls to produce a particle size range of 0.5 to 1.3 microns, and an average particle size of 0.8 microns. The milled particles are dried in air at 120° C. for 16 hours and calcined in an open alumina crucible at 800° C. for 4 hours. The milled particles are blended with 1 wt. %, based on the weight of the calcined particles, of polyvinyl alcohol. The resulting mixture is uniaxially cold pressed at 6000 PSI and sintered in an open alumina crucible at 950–1100° C. to produce a sintered disk that measures 10 mm diameter and 1 mm thick.

In manufacture of compounds of the formula $Bi_2(ZnTa_y)_{2/3}O_{((5y+11)/3)}$, ZnO and $Ta_2O_5$ are reacted at 1000° C. to produce $(ZnTa_y)_2O_{5y+2}$ according to equation (2):

$$2ZnO + yTa_2O_5 \rightarrow (ZnTa_y)_2O_{5y+2} \quad (2)$$

The $(ZnTa_y)_2O_{5y+2}$ then is reacted with $3Bi_2O_3$ according to equation (2A) at 950–1100° C. to produce a compound corresponding to $Bi_2(ZnTa_y)_{2/3}O_{((5y+11)/3)}$:

$$\tfrac{1}{3}(ZnTa_y)_2O_{5y+2} + Bi_2O_3 \rightarrow Bi_2(ZnTa_y)_{2/3}O_{((5y+11)/3)} \quad (2A)$$

In manufacture of $(ZnTa_y)_2O_{5y+2}$, reagent grade ZnO of 99.9% purity from Aldrich Chemical Co. and reagent grade $Ta_2O_5$ of 99.9% purity from Aldrich Chemical Co. are milled in deionized water in a ball mill. Milling is performed for 24 hours using yttrium-stabilized zirconia balls to produce a blend that has a particle size range of 0.3 to 1.5 microns, and an average particle size of 1.0 micron. The resulting milled particle blend is dried in air at 120° C. for 16 hours. The resulting dried particles are calcined at 1000° C. in an open alumina crucible for 4 hours to produce $(ZnTa_y)_2O_{5y+2}$.

$Bi_2O_3$ is mixed with the $(ZnTa_y)_2O_{5y+2}$ powder. The resulting mixture is ball milled for 24 hours using yttrium-stabilized zirconia balls to produce a particle size range of 0.5 to 1.3 microns, and an average particle size of 0.8 microns. The milled particles are dried in air at 120° C. for 16 hours and calcined in an open alumina crucible at 800° C. for 4 hours. The milled particles are blended with 1 wt. %, based on the weight of the calcined particles, of polyvinyl alcohol. The resulting mixture is uniaxially cold pressed at 6000 PSI and sintered in an open alumina crucible at 950–1100° C. to produce a sintered disk that measures 10 mm diameter and 1 mm thick.

The amounts of reactants, sintering temperatures, and the compositions of the resulting compounds produced in examples 1–14 are shown in Table 1. Compounds 1–10 also are shown in FIG. 1.

EXAMPLES 15–23

In a second embodiment, composites and solid solutions of the formula $r(Bi_2(Zn_{1/3}Ta_{2/3})_2O_7)$-$((1-r)(Bi_{3/2}Zn_{1/2})(Zn_{1/2}Ta_{3/2})O_7)$, $0 < r < 1$, are produced as the reaction products of mixtures of $Bi_2(Zn_{1/3}Ta_{2/3})_2O_7$ and $(Bi_{3/2}Zn_{1/2})(Zn_{1/2}Ta_{3/2})O_7$.

To illustrate, a series of mixtures of $Bi_2(Zn_{1/3}Ta_{2/3})_2O_7$ (r=1) and $(Bi_{3/2}Zn_{1/2})(Zn_{1/2}Ta_{3/2})O_7$ (r=0) powders are prepared according to the formula $r(Bi_2(Zn_{1/3}Ta_{2/3})_2O_7)$-$((1-r)(Bi_{3/2}Zn_{1/2})(Zn_{1/2}Ta_{3/2})O_7)$, $0 < r < 1$. These mixtures are prepared for (r) values of 0, 0.2, 0.3, 0.4, 0.5, 0.6, 0.85, and 1.0, which correspond to examples 15–23, respectively. The powders are ball milled with yttrium stabilized zirconia balls to an average particle size of 1 micron. The milled powders are dried at 120° C. for 16 hours, mixed with 1 wt. % organic binder, and uniaxially compressed at 6000 PSI into 10 mm thick disks of 1 mm thickness. The disks are sintered at 1000° C. for 4 hours in air to produce the solid solution.

The $Bi_2(Zn_{1/3}Ta_{2/3})_2O_7$ and the $(Bi_{3/2}Zn_{1/2})(Zn_{1/2}Ta_{3/2})O_7$ employed in examples 15–23 are produced as described below.

Manufacture of $Bi_2(Zn_{1/3}Ta_{2/3})_2O_7$ 15.55 gms. of reagent grade ZnO of 99.9% purity from Aldrich Chemical Co. and 84.45 gms. of reagent grade $Ta_2O_5$ of 99.9% purity from Aldrich Chemical Co. are milled in deionized water in a ball mill for 24 hours using yttrium-stabilized zirconia balls to produce a blend that has a particle size range of 0.3 to 1.5 microns, and an average particle size of 1.0 micron. The milled particle blend is dried in air at 120° C. for 16 hours. The resulting dried particles are calcined at 1000° C. in an open alumina crucible for 4 hours to produce $ZnTa_2O_6$.

57.19 gms. $Bi_2O_3$ are mixed with 42.81 gms. of the $ZnTa_2O_6$ powder. The resulting mixture is ball milled for 24 hours using yttrium-stabilized zirconia balls to produce a particle size range of 0.5 to 1.3 microns, and an average particle size of 0.8 microns. The milled particles are dried in air at 120° C. for 16 hours and calcined in an open alumina crucible at 800° C. for 4 hours. The milled particles are blended with 1 wt. %, based on the weight of the calcined particles, of polyvinyl alcohol. The resulting mixture is uniaxially cold pressed at 6000 PSI and sintered in an open alumina crucible at 950° C. to produce a sintered disk of $Bi_2(Zn_{1/3}Ta_{2/3})_2O_7$ that measures 10 mm diameter and 1 mm thick.

TABLE 1

| | | | Reactant oxides | | | | Final Compounds | | | | | |
|---|---|---|---|---|---|---|---|---|---|---|---|---|
| Ex. | x | y | $Ta_2O_5$ Mols. | ZnO Mols. | $Bi_2O_3$ Mols. | Sintering Temp. ° C. | $Ta_2O_5$ Mols. | $Ta_2O_5$ wt. % | ZnO Mols. | ZnO wt. % | $Bi_2O_3$ Mols. | $Bi_2O_3$ wt. % |
| 1 | 0.57 | — | 0.57 | 0.57 | 1.0 | 1000 | 26.636 | 32.959 | 26.636 | 6.070 | 46.729 | 60.971 |
| 2 | 0.667 | — | 0.667 | 0.667 | 1.0 | 1000 | 28.578 | 36.165 | 28.578 | 6.661 | 42.845 | 57.174 |
| 3 | 0.8 | — | 0.8 | 0.8 | 1.0 | 1000 | 30.769 | 39.964 | 30.769 | 7.361 | 38.462 | 52.675 |
| 4 | 1.0 | — | 1.0 | 1.0 | 10 | 1000 | 33.333 | 44.670 | 33.333 | 8.227 | 33.333 | 47.103 |
| 5 | 0 | — | 0.758 | 1.0 | 0.75 | 1000 | 30.00 | 43.478 | 40.00 | 10.677 | 30.00 | 45.845 |
| 6 | — | 1 | 0.2 | 0.4 | 0.6 | 1000 | 16.67 | 22.067 | 33.33 | 8.129 | 50.00 | 69.805 |
| 7 | — | 1.5 | 0.3 | 0.4 | 0.6 | 1000 | 23.10 | 29.811 | 30.80 | 7.321 | 46.20 | 62.868 |
| 8 | — | 2 | 0.4 | 0.4 | 0.6 | 1000 | 28.50 | 36.155 | 28.60 | 6.659 | 42.90 | 57.186 |
| 9 | — | 2.5 | 0.5 | 0.4 | 0.6 | 1000 | 33.33 | 41.447 | 26.70 | 6.107 | 40.00 | 52.446 |
| 10 | — | 3.0 | 0.6 | 0.4 | 0.6 | 1000 | 37.50 | 45.929 | 25.00 | 5.640 | 37.50 | 48.431 |
| 11 | 0.645 | — | 0.645 | 0.645 | 1.0 | 1000 | 28.166 | 35.473 | 28.166 | 6.534 | 43.669 | 57.993 |
| 12 | 0.656 | — | 0.656 | 0.656 | 1.0 | 1000 | 28.374 | 35.822 | 28.374 | 6.598 | 43.253 | 57.580 |
| 13 | 0.676 | — | 0.676 | 0.676 | 1.0 | 1000 | 28.778 | 36.504 | 28.778 | 6.723 | 42.445 | 56.773 |
| 14 | 0.69 | — | 0.69 | 0.69 | 1.0 | 1000 | 28.992 | 36.868 | 28.992 | 6.790 | 42.017 | 56.342 |

Manufacture of $(Bi_{3/2}Zn_{1/2})(Zn_{1/2}Ta_{3/2})O_7$ 15.55 gms. of reagent grade ZnO of 99.9% purity from Aldrich Chemical Co. and 84.45 gms. of reagent grade $Ta_2O_5$ of 99.9% purity from Aldrich Chemical Co. are milled in deionized water in a ball mill. Milling is performed for 24 hours using yttrium-stabilized zirconia balls to produce a blend that has a particle size range of 0.3 to 1.5 microns, and an average particle size of 1.0 micron. The milled particle blend is dried in air at 120° C. for 16 hours. The resulting dried particles are calcined at 1000° C. in an open alumina crucible for 4 hours to produce $ZnTa_2O_6$.

45.85 gms. $Bi_2O_3$ and 2.67 gms. ZnO are mixed with the 51.48 gms. $ZnTa_2O_6$. The resulting mixture is ball milled for 24 hours using yttrium-stabilized zirconia balls to produce a particle size range of 0.5 to 1.3 microns, and an average particle size of 0.8 microns. The milled particles are dried in air at 120° C. for 16 hours and calcined in an open alumina crucible at 800° C. for 4 hours. The milled particles are blended with 1 wt. %, based on the weight of the calcined particles, of polyvinyl alcohol. The resulting mixture is uniaxially cold pressed at 6000 PSI and sintered in an open alumina crucible at 950° C. to produce a sintered disk of $(Bi_{3/2}Zn_{1/2})(Zn_{1/2}Ta_{3/2})O_7$ that measures 10 mm diameter and 1 mm thick.

In manufacture of the $Bi_2(Zn_{1/3}Ta_{2/3})_2O_7$ and $(Bi_{3/2}Zn_{1/2})(Zn_{1/2}Ta_{3/2})O_7$ compounds as described above, reagent grade oxides of $Bi_2O_3$, ZnO and $Ta_2O_5$ of a purity >99.9% is used. It should be noted however, that non-reagent grade oxides of about 99% purity also can be used. In addition, binders other than polyvinyl alcohol can be used. Examples of other organic binders which may be used include but are not limited to polyethylene glycol, methylcellulose, carboxymethylcellulose, ethylcellulose, hydroxpropylcellulose, polyethylene oxide base high polymers, acrylic base high polymers, maleic anhydride base high polymers, starch, gelatine, polyoxyethylene alkyl ether, polyvinyl butyrol and waxes. In addition, it should be noted that ball milling may be done in media other than deionized water. Examples of suitable media include acetone.

EXAMPLES 24–27

In another aspect, the $Bi_2(Zn_{1/3}Ta_{2/3})_2O_7$ and $(Bi_{3/2}Zn_{1/2})(Zn_{1/2}Ta_{3/2})O_7$ compounds each may be mixed with glass such as a $P_2O_5$ type glass, a PbO type glass, and a $Bi_2O_3$ type glass, preferably a borosilicate glass, more preferably a $ZnO-B_2O_3-SiO_2$ type borosilicate glass, and then fired. The amount of glass added to these compounds may be up to about 5 wt. % based on the weight of the compound, preferably about 0.5 wt. %.

To illustrate, a borosilicate glass of the composition $ZnO-B_2O_3-SiO_2$ is added to $Bi_2(Zn_{1/3}Ta_{2/3})_2O_7$ to produce a blend. The blend then is ball milled in water with yttrium stabilized zirconia balls for 24 hours to produce an average particle size of 0.5 microns. The resulting milled powder is then mixed with 1 wt. % of polyvinyl alcohol binder based on the weight of the milled power. The resulting blend is uniaxially compressed at 6000 PSI into a pellet.

The sintering temperatures of various blends of $Bi_2(Zn_{1/3}Ta_{2/3})_2O_7$ and the $ZnO-B_2O_3-SiO_2$ borosilicate glass of composition 60 wt. % ZnO—30 wt. % $B_2O_3$—10 wt. % $SiO_2$ are shown in Table 2. The dielectric properties, as measured according to the procedures described below, of the blend of $Bi_2(Zn_{1/3}Ta_{2/3})_2O_7$ and 0.5 wt. % borosilicate glass sintered at 850° C., when measured at room temperature a frequency of 100 KHZ, are K=58.9, Q=1400 and TCC=50.0.

TABLE 2

| Example | 24 | 25 | 26 | 27 |
|---|---|---|---|---|
| Borosilicate glass (wt. %)* | 0.0 | 0.5 | 1.0 | 2.0 |
| Sintering Temp. ° C. | 1050 | 850 | 800 | 780 |

*Based on weight of $Bi_2(Zn_{1/3}Ta_{2/3})_2O_7$

Reacted blends of $Bi_2(Zn_{1/3}Ta_{2/3})_2O_7$ and glass, $(Bi_{3/2}Zn_{1/2})(Zn_{1/2}Ta_{3/2})O_7$ and glass, as well as mixtures thereof, also may be used to prepare solid solutions and composites as in the manner described above.

Dielectric Property Measurement

Gold electrodes then are sputtered onto each side of the sintered disk and the dielectric properties evaluated. The dielectric properties of each of sintered $Bi_2(Zn_{1/3}Ta_{2/3})_2O_7$, sintered $Bi_2(Zn_{1/3}Ta_{2/3})_2O_7$ with glass, sintered $(Bi_{3/2}Zn_{1/2})(Zn_{1/2}Ta_{3/2})O_7$, as well as sintered solid solutions of $Bi_2(Zn_{1/3}Ta_{2/3})_2O_7$ and $(Bi_{3/2}Zn_{1/2})(Zn_{1/2}Ta_{3/2})O_7$ are measured.

Measurement of dielectric properties such as (K, tan δ and TCC) at low frequencies of 1 KHz to 1 MHz is done while cooling at a rate of 2° C./min. over the temperature range of +150° C. to −170° C. in conjunction with a computer interfaced temperature chamber—chamber from Delta Design Corp., San Diego, Calif. The temperature is monitored with a K-type thermocouple or a Pt sensor. Measurements are made by using a Hewlett-Packard 4284 Inductance-Capacitance-Resistance ("LCR") meter. An AC field of 0.1 V/mm is applied to 10 mm diameter sintered pellets.

The (TCC, ppm/° C.) is calculated from the slope of the dielectric constant (K) over the temperature range of +120° C. to −55° C. and the dielectric constant at 25° C. Measurement of dielectric properties (K, tan δ and TCC) at high frequencies of 400 MHz to 20 GHZ is done over the temperature range of +150° C. to −170° C. by using the well known Hakki-Coleman method with a Hewlett-Packard HP 8510C network-spectrum-analyzer.

The measured properties are shown in Tables 3 to 7.

TABLE 3

Room Temperature K, Q and TCC at 1 K Hz for $Bi_2(ZnTa_2)_xO_{6x+3}$ Sintered at Various Temperatures

| | | 950° C. | | | 1000° C. | | | 1050° C. | | | 1100° C. | | |
|---|---|---|---|---|---|---|---|---|---|---|---|---|---|
| Ex. | x | K | Q | TCC | K | Q | TCC | K | Q | TCC | K | Q | TCC |
| 1 | 0.571 | 64.9 | 1379 | 75.1 | 67.2 | 1212 | 90.3 | 71.7 | 115 | 223.9 | 78.8 | 56 | 332.1 |
| 2 | 0.667 | 61.1 | 1053 | 39.5 | 60.8 | 1600 | 43.2 | 60.2 | 519 | 72.3 | 60.2 | 755 | 76.1 |
| 3 | 0.85 | 33.5 | 1667 | −14.3 | 56.8 | 1250 | −8.1 | 62.9 | 6667 | −18.4 | 63.1 | 1250 | 20.9 |
| 4 | 1.000 | 45.8 | 1429 | −61.1 | 63.6 | 1212 | −69.6 | 65.6 | 1143 | −76.5 | 67.5 | 1379 | −72.7 |
| 11 | .645 | 62.8 | 4000 | 54.9 | 62.9 | 4000 | 57.7 | 64.9 | 476 | 87.7 | 63.1 | 131 | 165.4 |
| 12 | .656 | 61.9 | 4444 | 50.5 | 61.9 | 4000 | 55.5 | 64.0 | 404 | 75.9 | 62.0 | 185 | 126.4 |

TABLE 3-continued

Room Temperature K, Q and TCC at 1 KHz for $Bi_2(ZnTa_2)_xO_{6x+3}$ Sintered at Various Temperatures

| | | 950° C. | | | 1000° C. | | | 1050° C. | | | 1100° C. | | |
|---|---|---|---|---|---|---|---|---|---|---|---|---|---|
| Ex. | x | K | Q | TCC | K | Q | TCC | K | Q | TCC | K | Q | TCC |
| 13 | .678 | 47.7 | 1177 | 4.4 | 61.6 | 1026 | 24.0 | 63.0 | 1212 | 38.2 | 61.8 | 1143 | 41.3 |
| 14 | .690 | 29.9 | 1667 | −0.9 | 42.3 | 1177 | 11.2 | 62.9 | 1250 | 26.1 | 59.0 | 1177 | 61.7 |

TABLE 4

Dielectric Properties at Room Temperature, at 1 MHz

| Example | r | Sintering Temp. °C. | Sintering Time Hr. | K | tan δ | TCC |
|---|---|---|---|---|---|---|
| 15 | 0 | 1000 | 4 | 71.4 | <0.005 | −172 ppm/C |
| 16 | 0.2 | 1000 | 4 | 77.5 | <0.003 | −164 |
| 17 | 0.3 | 1000 | 4 | 76.9 | <0.003 | −143 |
| 18 | 0.4 | 1000 | 4 | 72.9 | <0.003 | −106 |
| 19 | 0.5 | 1000 | 4 | 70.7 | <0.002 | −62 |
| 20 | 0.6 | 1000 | 4 | 68.3 | <0.002 | −21 |
| 21 | 0.7 | 1000 | 4 | 460.8 | <0.002 | 9.5 |
| 22 | 0.85 | 1000 | 4 | 64.3 | <0.002 | 59 |
| 23 | 1 | 950 | 4 | 60.8 | <0.001 | 60 |

TABLE 5

K at 1 MHz over the range of −160° C. to +120° C. (Compounds Sintered at 1000° C. for 4 hrs)

| Example | r | −160° C. | −120° C. | −80° C. | 0° C. | 40° C. | 80° C. | 120° C. |
|---|---|---|---|---|---|---|---|---|
| 15 | 0.0 | 72.8 | 74.3 | 74.1 | 73.3 | 72.9 | 72.4 | 71.9 |
| 16 | 0.2 | 77.3 | 78.9 | 78.6 | 77.8 | 77.3 | 76.7 | 76.1 |
| 17 | 0.3 | 76.7 | 78.0 | 77.8 | 77.1 | 76.7 | 76.2 | 75.7 |
| 18 | 0.4 | 72.8 | 74.0 | 73.7 | 73.0 | 72.8 | 72.4 | 72.1 |
| 19 | 0.5 | 70.2 | 71.0 | 70.9 | 70.7 | 70.6 | 70.4 | 70.1 |
| 20 | 0.6 | 67.8 | 68.2 | 68.3 | 68.3 | 68.3 | 68.2 | 68.1 |
| 21 | 0.74 | 60.3 | 60.8 | 60.7 | 60.7 | 60.8 | 60.8 | 60.8 |
| 22 | 0.8 | 63.3 | 63.5 | 63.8 | 64.2 | 64.4 | 64.5 | 64.6 |
| 23 | 1.0 | 60.5 | 61.0 | 61.3 | 61.7 | 62.0 | 62.2 | 62.3 |

TABLE 6

K at 10 KHz over the range of −160° C. to −120° C. (Compounds Sintered at 1000° C. for 4 hrs)

| Example | r | −160° C. | −120° C. | −80° C. | 0° C. | 40° C. | 80° C. | 120° C. |
|---|---|---|---|---|---|---|---|---|
| 15 | 0.0 | 74.6 | 74.7 | 74.4 | 73.6 | 73.1 | 72.6 | 72.1 |
| 16 | 0.2 | 78.4 | 78.4 | 78.1 | 77.2 | 76.6 | 76.1 | 75.5 |
| 17 | 0.3 | 77.2 | 77.2 | 76.9 | 76.2 | 75.1 | 75.2 | 74.7 |
| 18 | 0.4 | 73.1 | 73.0 | 72.8 | 72.2 | 71.9 | 71.5 | 71.2 |
| 19 | 0.5 | 70.8 | 70.9 | 70.8 | 70.6 | 70.4 | 70.2 | 70.0 |
| 20 | 0.6 | 68.5 | 68.6 | 68.6 | 68.7 | 68.6 | 68.5 | 68.4 |
| 21 | 0.74 | 57.9 | 58.1 | 58.0 | 58.0 | 58.1 | 58.1 | 58.1 |
| 22 | 0.8 | 62.7 | 62.9 | 63.1 | 63.3 | 63.8 | 63.9 | 64.0 |
| 23 | 1.0 | 60.8 | 61.1 | 61.3 | 61.9 | 62.2 | 62.5 | 62.7 |

TABLE 7 tan δ at 1 MHz over the range of −160° C. to +120° C. (Sintered at 1000° C. for 4 hrs)

| Example | r | −160° C. | −120° C. | −80° C. | 0° C. | 40° C. | 80° C. | 120° C. |
|---|---|---|---|---|---|---|---|---|
| 15 | 0 | 0.03 | <0.004 | <0.004 | 0.001 | <0.004 | <0.004 | <0.004 |
| 16 | 0.2 | 0.01 | 0.003 | <0.003 | <0.003 | <0.003 | <0.003 | <0.003 |

TABLE 7-continued tan δ at 1 MHz over the range of
−160° C. to +120° C. (Sintered at 1000° C. for 4 hrs)

| Example | r | −160° C. | −120° C. | −80° C. | 0° C. | 40° C. | 80° C. | 120° C. |
|---|---|---|---|---|---|---|---|---|
| 17 | 0.3 | 0.013 | 0.002 | <0.003 | <0.003 | <0.003 | <0.003 | <0.003 |
| 18 | 0.4 | 0.03 | 0.003 | <0.003 | <0.003 | <0.003 | <0.003 | <0.003 |
| 19 | 0.5 | 0.007 | 0.002 | <0.002 | <0.002 | <0.002 | <0.002 | <0.002 |
| 20 | 0.6 | 0.0043 | 0.002 | <0.002 | <0.002 | <0.002 | <0.002 | <0.002 |
| 21 | 0.74 | 0.002 | 0.002 | <0.002 | <0.002 | <0.002 | <0.002 | <0.002 |
| 22 | 0.8 | 0.001 | <0.001 | <0.001 | <0.001 | <0.001 | <0.001 | <0.001 |
| 23 | 1.0 | <0.001 | <0.001 | <0.001 | <0.001 | <0.001 | <0.001 | <0.001 |

What is claimed is:

1. A bismuth pyrochlore microwave dielectric compound of the formula $Bi_2(ZnTa_2)_xO_{6x+3}$ where $0.57 \leq x \leq 1.0$, where $x \neq 0.667$.

2. A bismuth pyrochlore microwave dielectric compound of the formula $Bi_2(ZnTa_2)_xO_{6x+3}$ where $x=0.57$.

3. The bismuth pyrochlore microwave dielectric compound of the formula $Bi_2(ZnTa_2)_xO_{6x+3}$ where $x=0.80$.

4. A bismuth pyrochlore microwave dielectric compound of the formula $Bi_2(ZnTa_y)_{2/3}O_{((5y+11)/3)}$ where $1.0 \leq y \leq 3.0$, provided that y is not 2.0.

5. A bismuth pyrochlore microwave dielectric compound of claim 4 where $y=1.0$.

6. A bismuth pyrochlore microwave dielectric compound of claim 4 where $y=1.5$.

7. A bismuth pyrochlore microwave dielectric compound of claim 4 where $y=2.5$.

8. A bismuth pyrochlore microwave dielectric compound of claim 4 where $y=3.0$.

9. A bismuth pyrochlore microwave dielectric compound according to the formula $r(Bi_2(Zn_{1/3}Ta_{2/3})_2O_7)-((1-r)(Bi_{3/2}Zn_{1/2})(Zn_{1/2}Ta_{3/2})O_7))$ where $0<r<1$.

10. The bismuth pyrochlore microwave dielectric compound according to claim 9 where $r=0.2$.

11. The bismuth pyrochlore microwave dielectric compound according to claim 9 where $r=0.3$.

12. The bismuth pyrochlore microwave dielectric compound according to claim 9 where $r=0.4$.

13. The bismuth pyrochlore microwave dielectric compound according to claim 9 where $r=0.5$.

14. The bismuth pyrochlore microwave dielectric compound according to claim 9 where $r=0.6$.

15. The bismuth pyrochlore microwave dielectric compound according to claim 9 where $r=0.85$.

16. A bismuth pyrochlore microwave dielectric compound that is reaction product of a borosilicate glass and $Bi_2(ZnTa)_{2/3}O_7$.

17. The bismuth pyrochore microwave dielectric compound of claim 16 wherein the borosilicate glass is about 5 wt. % of the $Bi_2(ZnTa)_{2/3}O_7$.

18. The bismuth pyrochlore microwave dielectric compound of claim 17 wherein the glass is a $ZnO$—$B_2O_3$—$SiO_2$ glass.

19. The bismuth pyrochlore microwave dielectric compound of claim 18 wherein the glass is 60 wt. % $ZnO$-30 wt. % $B_2O_3$-10 wt. % $SiO_2$.

20. The bismuth pyrochlore microwave dielectric compound of claim 16 wherein the borosilicate glass is about 0.5 wt. % of the $Bi_2(ZnTa)_{2/3}O_7$.

21. A bismuth pyrochlore microwave dielectric compound of the formula $Bi_2(ZnTa_2)_xO_{6x+3}$ where $x=1.0$.

* * * * *